(No Model.)

T. B. JEFFERY.
VEHICLE WHEEL.

No. 383,129. Patented May 22, 1888.

Witnesses:
Cora L. Cadwallader,
Mary L. Purinton.

Inventor:
Thomas B. Jeffery
By Burton & Burton
his Attorneys.

UNITED STATES PATENT OFFICE.

THOMAS B. JEFFERY, OF RAVENSWOOD, ILLINOIS.

VEHICLE-WHEEL.

SPECIFICATION forming part of Letters Patent No. 383,129, dated May 22, 1888.

Application filed August 5, 1887. Serial No. 246,230. (No model.)

*To all whom it may concern:*

Be it known that I, THOMAS B. JEFFERY, a citizen of the United States, residing at Ravenswood, county of Cook, State of Illinois, have invented certain new and useful Improvements in Vehicle-Wheels, which are fully described in the following specification, reference being had to the accompanying drawings, forming a part thereof.

Figure 1:
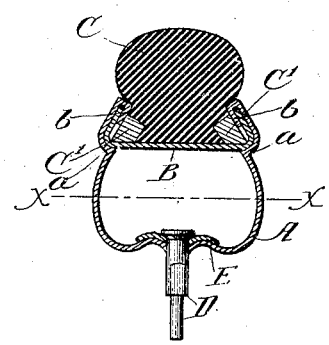
Figure 3:
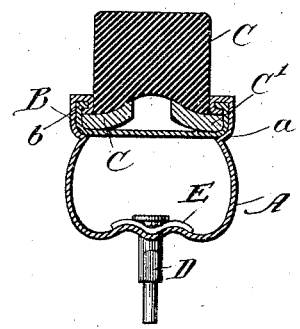
Figure 2:
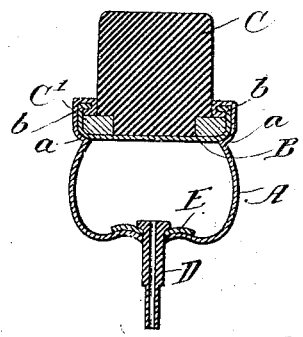
Figure 4:
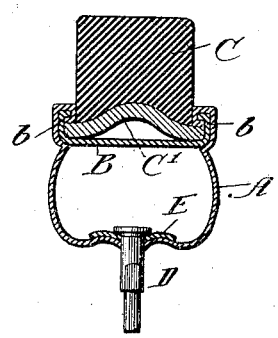
Figure 5:
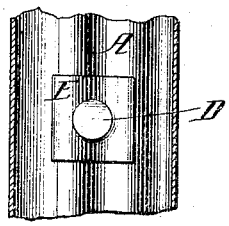

In the drawings, Figure 1 is a vertical section of a vehicle-wheel felly and tire, showing my improvement. Figs. 2, 3, and 4 are modifications of same. Fig. 5 is a section through *x x*, Fig. 1.

A is the rim, having the shoulders *a*, upon which rests the band B, having flanges *b* to receive the tire.

C is the rubber tire; C', hard rubber or metal strips secured thereto and engaging beneath and between the flanges *b*, whereby the tire is secured to the felly.

D is the spoke-nipple bearing against the washer E.

My invention relates to the felly and tire of a vehicle-wheel, and particularly to velocipede-wheels, and is so shown and described herein. One of its objects is to provide a method of attaching spokes to the rim without the necessity of any hole therein, except the one through which the spoke or nipple is attached, and so to avoid the weakening of the rim caused by an extra hole. I therefore form the rim of one piece bent into any desired form, but leaving a space between its edges through which the spokes or nipples are passed into holes bored in the inner wall and made fast in the usual manner. I then provide the band B and secure it to the rim to cover this space, and form with the rim A a solid felly. This much of my device, however, is shown and claimed in another application, and I do not claim it, broadly, here.

In the device shown in the above-mentioned application the band B was secured to the rim A by being made to overlap the adjacent edges of the rim, and brazed, soldered, or welded to the rim. My present improvement is a device for effecting such securement without the necessity for such brazing, welding, or soldering, and consists in forming on each side of the rim A an interior shoulder, *a*, on which to rest the flanged band B, and then bending the rim about the flanges *b*, so as to clasp them firmly. These flanges may be straight and the clasping be effected by one turn about their ends, as shown in Fig. 1, or they may be given a square turn near their ends, causing two turns in the rim, as shown in Figs. 2, 3, and 4.

Another object of my invention is to provide a method of attaching the rubber tire to the rim more easily and quickly than has been possible by the ordinary mode when cement alone is used. This usual method is difficult and not altogether reliable, and necessitates heating the rim, which requires special facilities. This object I accomplish by forming on the inner edge of the soft-rubber tire lateral projections, preferably of some harder substance—as hard rubber or metal—which projections shall engage under and between the flanges formed by the flanges *b* and the overlapping rim, and by them be securely held in position on the felly. These projections may be formed by two strips of hard substance attached to the tire, as shown in Figs. 1, 2, and 3, in which case the rubber tire, by its elasticity, will allow of sufficient compression, so that the projections can be forced under the flanges, or to the inner side of the tire a single strip may be attached, which, being itself elastic, can be sprung into the desired position, as shown by Fig. 4. Where two strips are used, they may be so formed that the tire will fill the space between their proximate edges and dovetail under them, as in Fig. 1, and so give additional strength to the securement by causing that the tire, in order to be loosened by use, would have to be torn, not only directly away from these strips, but also, as to this dovetail, out from under them. Figs. 2 and 3 show modified forms of the device where two strips are used, in the former the space between the proximate edges of the strips being filled by the tire, in the latter an air-space being left.

A third object of my invention is to provide means for preventing the tension of the spokes from stretching the rim, and so allowing the spokes to become loose and the rim drawn out of its original shape. For this purpose I form a section of the inner wall of the rim in the form of a scallop, comprising a sinuosity more or less abrupt on each side of the middle, (at which point the rim is apertured for the spokes). I also provide a washer, E, for the expanded head of the spoke or spoke-nipple, shaped to embrace said sinuosities and broad enough to cover all the curves and bear against the outer slope of the side one. Thus when the tension of the tightened spokes bears against the washers, the tendency will be to draw their ends tightly upon the outer sides of the curves and so rather draw them together and shorten their angles than to spread them and so flatten the rim.

I claim—

1. In a vehicle-wheel, in combination with the hollow rim flanged to receive the tire, a rubber tire having along each side a separate projecting strip of harder material secured thereto and engaging, respectively, under the said flanges, whereby the tire is secured to the rim, substantially as and for the purpose set forth.

2. In a vehicle-wheel, in combination with the hollow rim flanged to receive the tire, a rubber tire having along each side a separate projecting strip of harder material secured thereto and engaging, respectively, under the said flanges, whereby the tire is secured to the rim, the rubber tire filling the space between the proximate edges of the strips, substantially as and for the purpose set forth.

3. In a vehicle-wheel, in combination with the hollow rim flanged to receive the tire, a rubber tire having along each side a separate projecting strip of harder material secured thereto and engaging, respectively, under the said flanges, whereby the tire is secured to the rim, the rubber tire filling the space between and extending partially under the proximate edges of the strips, substantially as and for the purpose set forth.

4. In a vehicle-wheel, in combination with the hollow rim having an interior shoulder on each side, and a band resting upon such shoulders and flanged to receive the tire, a rubber tire having harder material secured thereto and projecting along each side, engaging under the said flanges, whereby the tire is secured to the rim, substantially as and for the purpose set forth.

5. In a vehicle-wheel, in combination with the hollow rim having an interior shoulder on each side, and a band resting upon such shoulders and flanged to receive the tire, and having its said flanges clasped by the rim bent about them, a rubber tire having harder material secured thereto and projecting along each side, engaging under the said flanges, whereby the tire is secured to the rim, substantially as and for the purpose set forth.

6. In a vehicle-wheel, in combination with the rim, a section of whose inner wall in a radial plane is a scallop comprising a sinuosity on each side of the middle, and which has apertures at the middle for the spokes, washers shaped to embrace said sinuosities and correspondingly apertured for the spokes, whereby the radial tension of the spokes is exerted on the rim at the outer sides, respectively, of the sinuosities, substantially as and for the purpose set forth.

7. In a vehicle-wheel, in combination with the rim, a section of whose inner wall in a radial plane is a scallop comprising an abrupt sinuosity on each side of the middle, and which has apertures at the middle for the spokes, washers shaped to embrace said sinuosities and correspondingly apertured for the spokes, whereby the radial tension of the spokes is exerted on the rim at the outer sides, respectively, of the sinuosities, substantially as and for the purpose set forth.

8. In a vehicle-wheel, in combination with the rim, a section of whose inner wall in a radial plane is a scallop comprising a sinuosity on each side of the middle, and which has at the middle a depression to receive the heads of the spokes, and apertures for the spokes, washers shaped to embrace said sinuosities and correspondingly apertured for the spokes, whereby the radial tension of the spokes is exerted on the rim at the outer sides, respectively, of the sinuosities, substantially as and for the purpose set forth.

In testimony whereof I have hereunto set my hand and seal at Chicago, Illinois, this 1st day of August, 1887, in the presence of two witnesses.

THOS. B. JEFFERY.

Witnesses:
E. F. BURTON,
CORA L. CADWALLADER.